United States Patent
Sica et al.

(10) Patent No.: US 7,267,349 B2
(45) Date of Patent: Sep. 11, 2007

(54) MATERIAL HANDLING LIFT VEHICLE AND SUSPENSION SYSTEM FOR USE THEREWITH

(75) Inventors: Patsy L. Sica, New Philadelphia, OH (US); Jeremiah J. Beck, Dundee, OH (US)

(73) Assignee: Beech Engineering & Manufacturing, New Philadelphia, OH (US)

( * ) Notice: Subject to any disclaimer, the term of this patent is extended or adjusted under 35 U.S.C. 154(b) by 295 days.

(21) Appl. No.: 10/933,732

(22) Filed: Sep. 3, 2004

(65) Prior Publication Data

US 2006/0049003 A1   Mar. 9, 2006

(51) Int. Cl.
*B60G 3/12* (2006.01)
(52) U.S. Cl. .............................. 280/124.128; 187/222
(58) Field of Classification Search ..............................
280/124.134–124.137, 124.152–124.154,
280/124.128, 124.13, 779; 414/592; 187/222,
187/233
See application file for complete search history.

(56) References Cited

U.S. PATENT DOCUMENTS

| | | | |
|---|---|---|---|
| 4,114,923 A | 9/1978 | Raidel | |
| 4,132,432 A | 1/1979 | Raidel | |
| 4,309,045 A | 1/1982 | Raidel | |
| 4,750,579 A * | 6/1988 | Jarl et al. | 180/24.02 |
| 5,113,960 A * | 5/1992 | Prinz | 180/65.5 |
| 5,366,237 A | 11/1994 | Dilling et al. | |
| 5,505,482 A | 4/1996 | VanDenberg | |
| 5,924,712 A | 7/1999 | Pierce | |
| 6,099,234 A * | 8/2000 | Mason | 414/607 |

\* cited by examiner

*Primary Examiner*—Paul N. Dickson
*Assistant Examiner*—Drew J. Brown
(74) *Attorney, Agent, or Firm*—Sand & Sebolt

(57) ABSTRACT

A material handling lift for moving a load horizontally over a surface and vertically with respect to that surface and a suspension system for the material handling lift. The material handling lift includes a frame with wheels for traveling over the surface. At least one of the wheels is a drive wheel mounted on a vertically-oriented steering column. The steering column is connected to the frame by a parallelogram type suspension system which includes swing arms that are pivotally connected to the frame. A stabilizer bar is connected between the free ends of the swing arms and a shock dampener is connected between the frame and a swing arm. The suspension system helps dampen the shock of traveling over uneven terrain, helps to keep the steering column vertical and the wheels of the vehicle on the ground thereby helping to maintain constant traction with the surface and control of the steering, braking and acceleration of the vehicle. Furthermore, the suspension system aids in providing constant steering effort for the vehicle, regardless of the weight of the load carried.

30 Claims, 15 Drawing Sheets

MATERIAL HANDLING LIFT VEHICLE AND SUSPENSION SYSTEM FOR USE THEREWITH

BACKGROUND OF THE INVENTION

TECHNICAL FIELD

This invention generally relates to vehicles for lifting and transporting materials. More particularly, the invention relates to power-driven walk-behind vehicles that are used to move loads both horizontally over a surface and vertically with respect to the surface. Specifically, the invention relates to a vehicle which includes a suspension system connecting the drive wheel to the frame of the vehicle and which enables the vehicle to travel over an uneven surface.

BACKGROUND INFORMATION

Power-driven walk-behind vehicles, such as powered pallet jacks, powered material transfer trucks and powered pallet stackers are commonly used in the manufacturing and retailing industries for moving heavy loads from one location to another within a factory or store and for stacking products on top of each other. When the powered vehicle travels across even terrain, all of its wheels remain in contact with the ground surface and the weight of the vehicle is distributed across all of the wheels. The vehicle is, therefore, able to move forward at a relatively constant speed. If, however, the vehicle travels over uneven terrain, one of the wheels may enter a small hole or depression in the surface and this may cause other wheels to be temporarily lifted off the ground surface. This causes a hesitation in the forward motion of the vehicle and causes the drive wheel to lose traction and the operator momentarily loses control of steering, acceleration and braking. Similarly, if the vehicle travels over a small bump in the terrain, some of the wheels may lift off the ground causing additional force to be placed on the drive wheel and additional strain on the motor. This is particularly problematic if the drive wheel of the vehicle is the wheel which travels over the bump and some or all of the side wheels are temporarily lifted off the ground. This greatly increases the strain on the motor and thereby reduces the motor's life and greatly increases the operator's steering effort. Furthermore, powered vehicles are designed to carry heavy loads and these loads have to be positioned correctly in order to maintain the vehicle's center of gravity in a particular location for safe operation. If wheels are lifted off the ground, the vehicle's center of gravity may be shifted to an unsafe position and the vehicle may tip over putting the vehicle, operator and load at risk.

There is therefore a need in the art for a material handling lift vehicle that is able to negotiate both even and uneven terrain without being prone to having some of its wheels lift off the ground and which can therefore maintain substantially constant traction and continuous operator control, i.e., steering, acceleration and braking, regardless of surface conditions or weight of load being carried.

SUMMARY OF THE INVENTION

It is therefore an object of the present invention to provide a material handling lift vehicle with a suspension system connecting its drive wheel to the vehicle frame. The suspension system adjusts the drive wheel's relative position when the vehicle travels over uneven terrain so that the vehicle's wheels are all kept in contact with the ground. The suspension system also holds the steering rod, onto which the drive wheel is mounted, in a substantially vertical position when the vehicle is traveling over uneven terrain.

The material handling lift vehicle includes a frame that has side wheels mounted on it to travel over the ground surface. At least a portion of the frame holds the load thereon. A drive wheel is received on an axle mounted at one end of a steering column. A parallelogram type suspension connects the steering column to the frame. The parallelogram type suspension includes at least one pair of swing arms that extend outwardly from the frame and are pivotally connected thereto, a stabilizer bar fixedly connected between the swing arms and at least one shock absorber or dampener connected at one end to the frame and pivotally connected at the other end to the swing arms. A plate extends between the stabilizer bar and the steering column and is fixedly connected thereto. When the drive wheel travels over the uneven surface, rotational movement in the suspension system causes a vertical movement in the steering column and thus any shocks to the system are dampened. Consequently, all the wheels of the vehicle tend to remain in contact with the surface over which the vehicle is traveling regardless of the condition of that surface.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
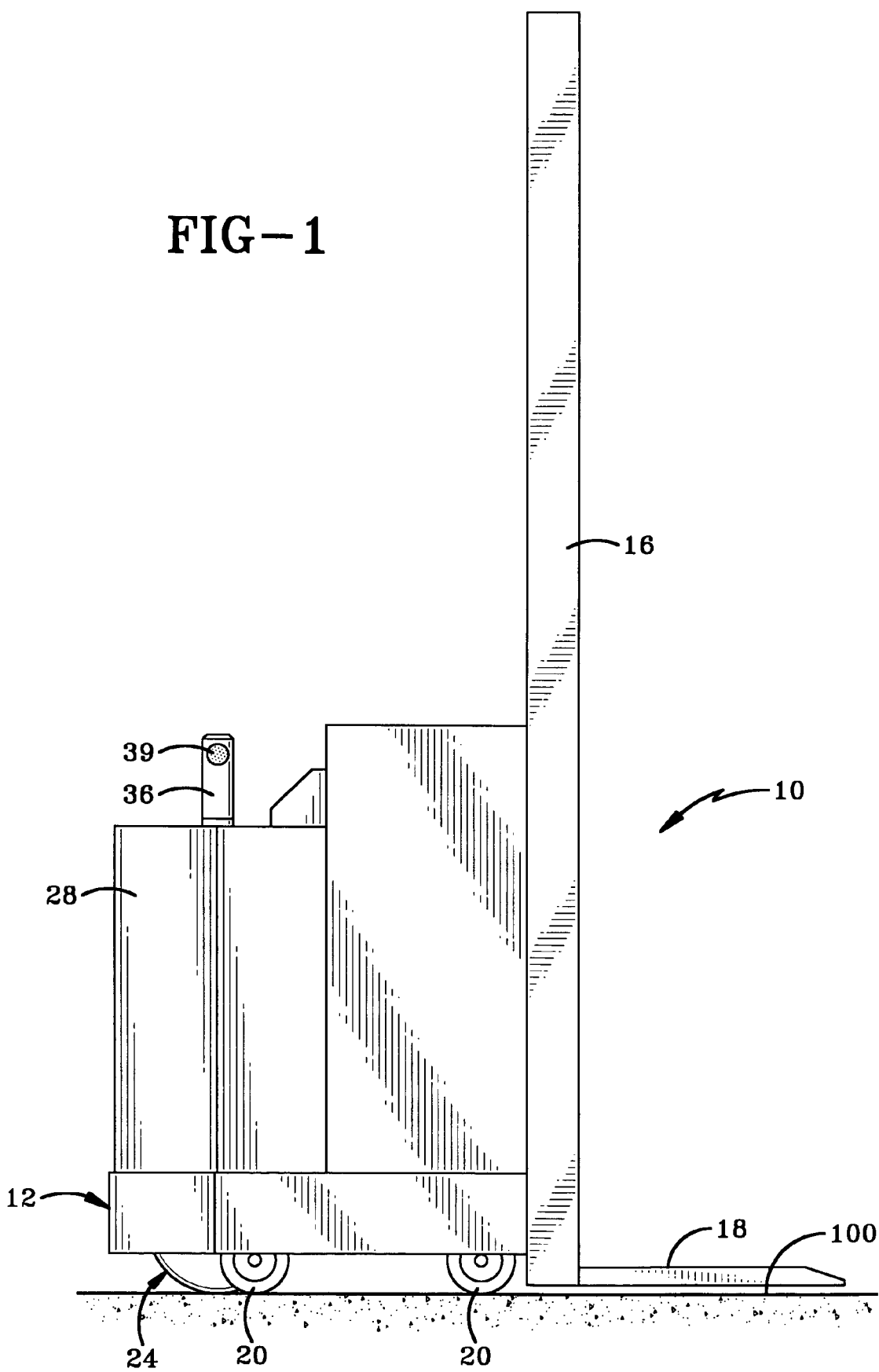
FIG. 1 is a side elevational view of a material handling lift vehicle in accordance with the present invention.

Referring to FIGS. 1-9, there is shown a material handling lift vehicle, generally indicated at 10. Material handling lift vehicle 10 includes a frame, generally indicated at 12, onto which is mounted a power unit (not shown), a support 16 and a load carrying platform 18. Two pairs of laterally spaced side wheel assemblies 19 and 21, having wheels 20 and 22 respectively, are provided on the underside of frame 12. A non load-bearing drive wheel assembly 24 is connected to a steering column 26 and is positioned intermediate side wheel assemblies 19 and 21. Drive wheel 24 is provided with a parallelogram-style suspension system, generally indicated at 27. Both the power unit (not shown) and suspension system 27 are covered by a hood 28 for protection and to make material handling lift vehicle 10 more aesthetically pleasing.

Figure 2:
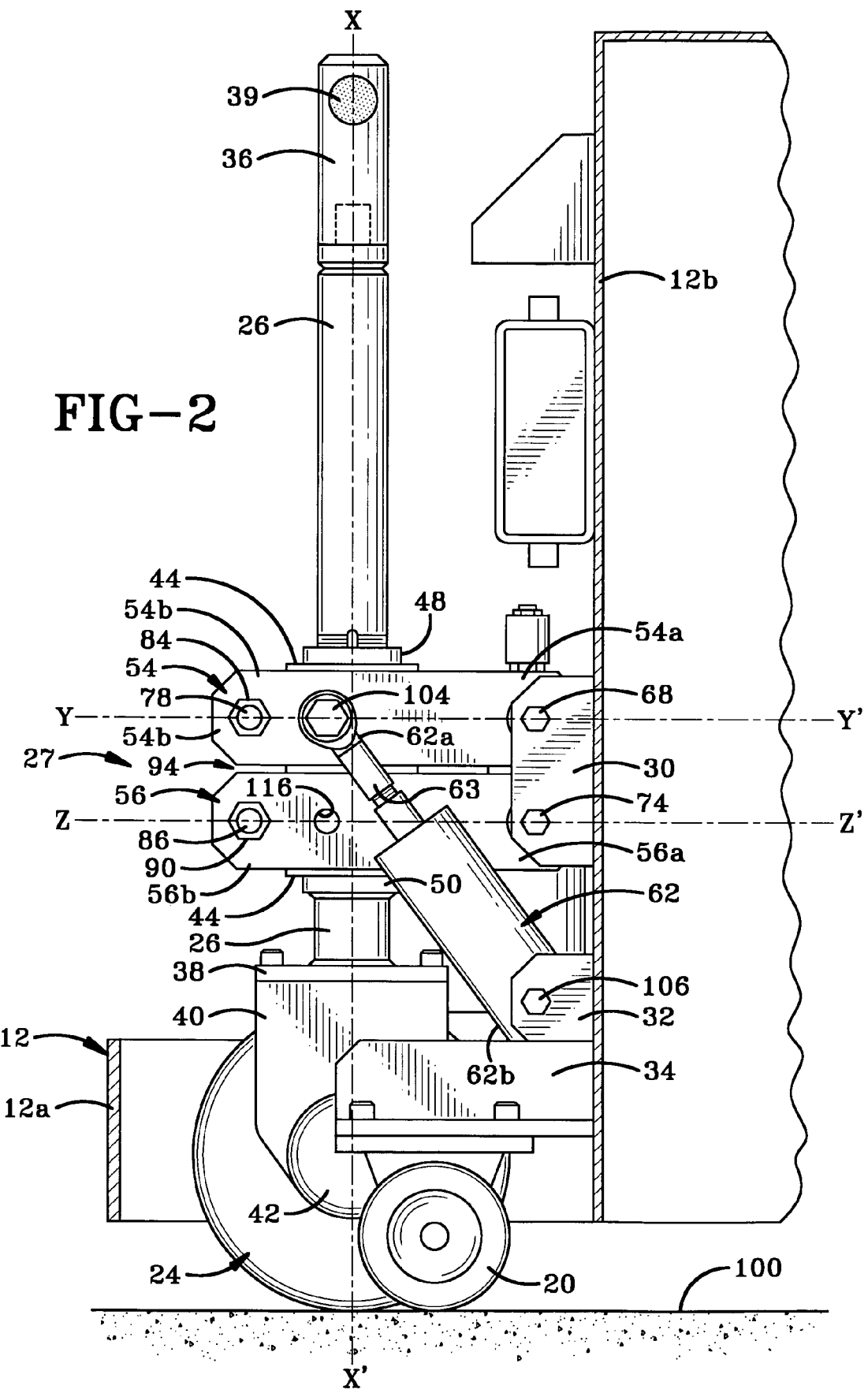
FIG. 2 is a partial cross-sectional side elevational view of the material handling lift vehicle with the hood removed to show the suspension system of the present invention connected to the steering column.
Figure 3:
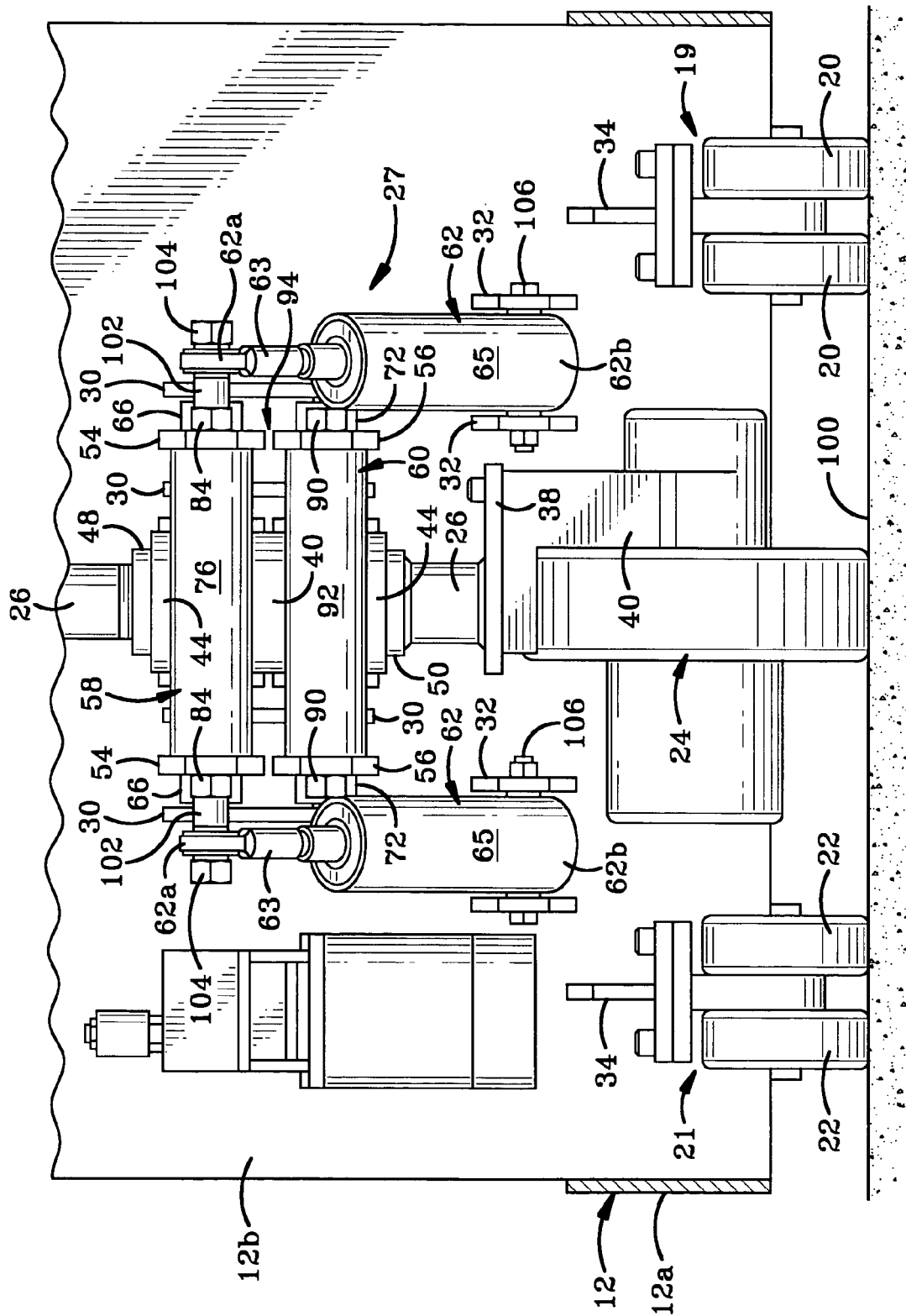
FIG. 3 is a partial front elevational view of the material handling lift vehicle and suspension system shown in FIG. 2.

Still, referring to FIGS. 1-9, frame 12 includes a horizontal portion 12a and a vertical portion 12b (FIG. 2). A plurality of pairs of support brackets 30, 32 and 34 are mounted on vertical section 12b and extend outwardly therefrom at substantially ninety degrees thereto. Brackets 30 and 32 connect frame 12 and steering column 26 together via components of suspension system 27 as will be hereinafter described. Brackets 34 connect the side wheel assemblies 19, 21 to frame 12.

Steering column 26 is an elongated tubular member having a longitudinal axis indicated by line X-X' (FIG. 2). A steering column cap 36 is screwed onto one end of steering column 26 and a handle 37 extends outwardly from cap 36 to enable an operator to move stacker 10. A mount plate 38 is welded onto the opposite end of steering column 26. An axle support flange 40 extends downwardly from mount plate 38 and supports an axle 42 which extends outwardly from mount plate 38 and through the bore (not shown) of drive wheel 24. Axle 42 lies substantially at ninety degrees to the longitudinal axis X-X' of steering column 26. A housing 44, having a central bore 46 (FIG. 4), is coaxially disposed around a portion of steering column 26 intermediate cap 36 and mount plate 38. Housing 44 is spaced a distance above mount plate 38 and between a pair of collars 48 and 50 (FIG. 7) and is connected to steering column 26 at bearing assemblies 52.

In accordance with one of the main features of the invention and referring to FIGS. 2-9, suspension system 27 includes a pair of laterally spaced upper swing arms 54, a pair of laterally spaced lower swing arms 56, an upper stabilizer bar 58, a lower stabilizer bar 60 and a pair of shock dampeners 62. When these components are connected together and to frame 12, they are arranged to form a parallelogram-style suspension system for maintaining steering column 26 substantially vertical and to reduce the tendency of steering column 26 to move from a vertical position when drive wheel 24 travels over an uneven surface. Steering column 26 is disposed within the parallelogram formed by upper and lower swing arms 54, 56; stabilizer bars 58, 60 and frame 12.

Figure 9:
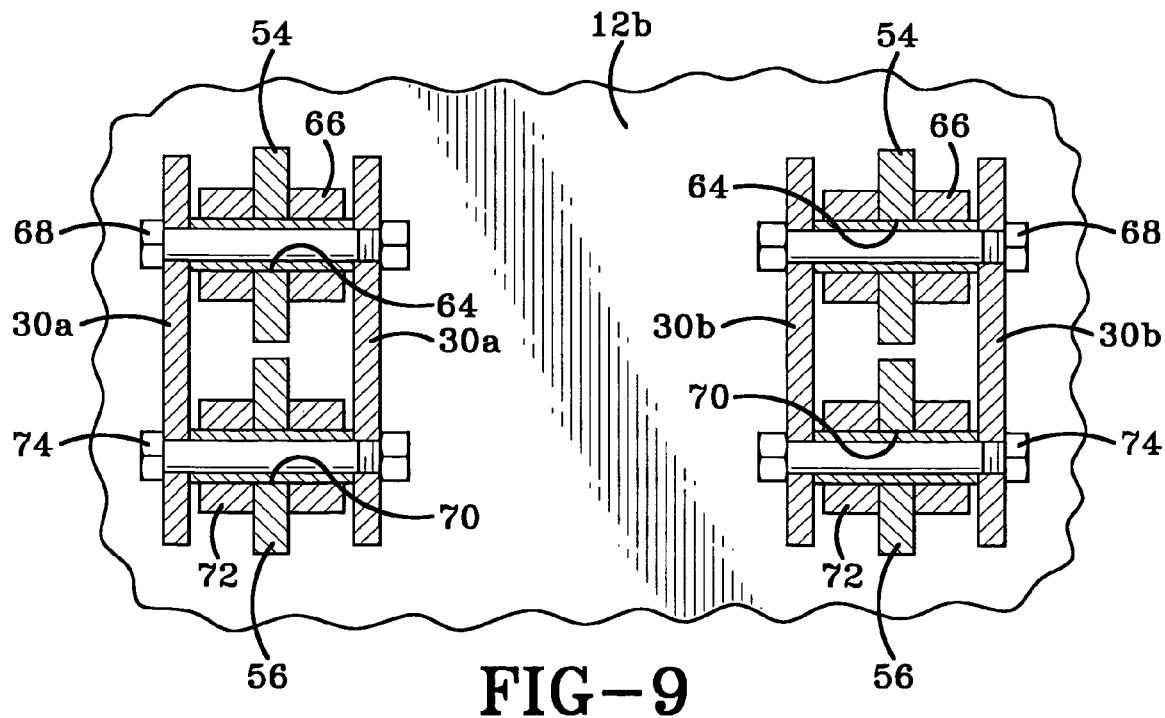
FIG. 9 is a partial cross-sectional front elevational view through line 9-9 of FIG. 4, showing the connection of the upper and lower swing arms to the bracket mounted on the frame.
Figure 10:
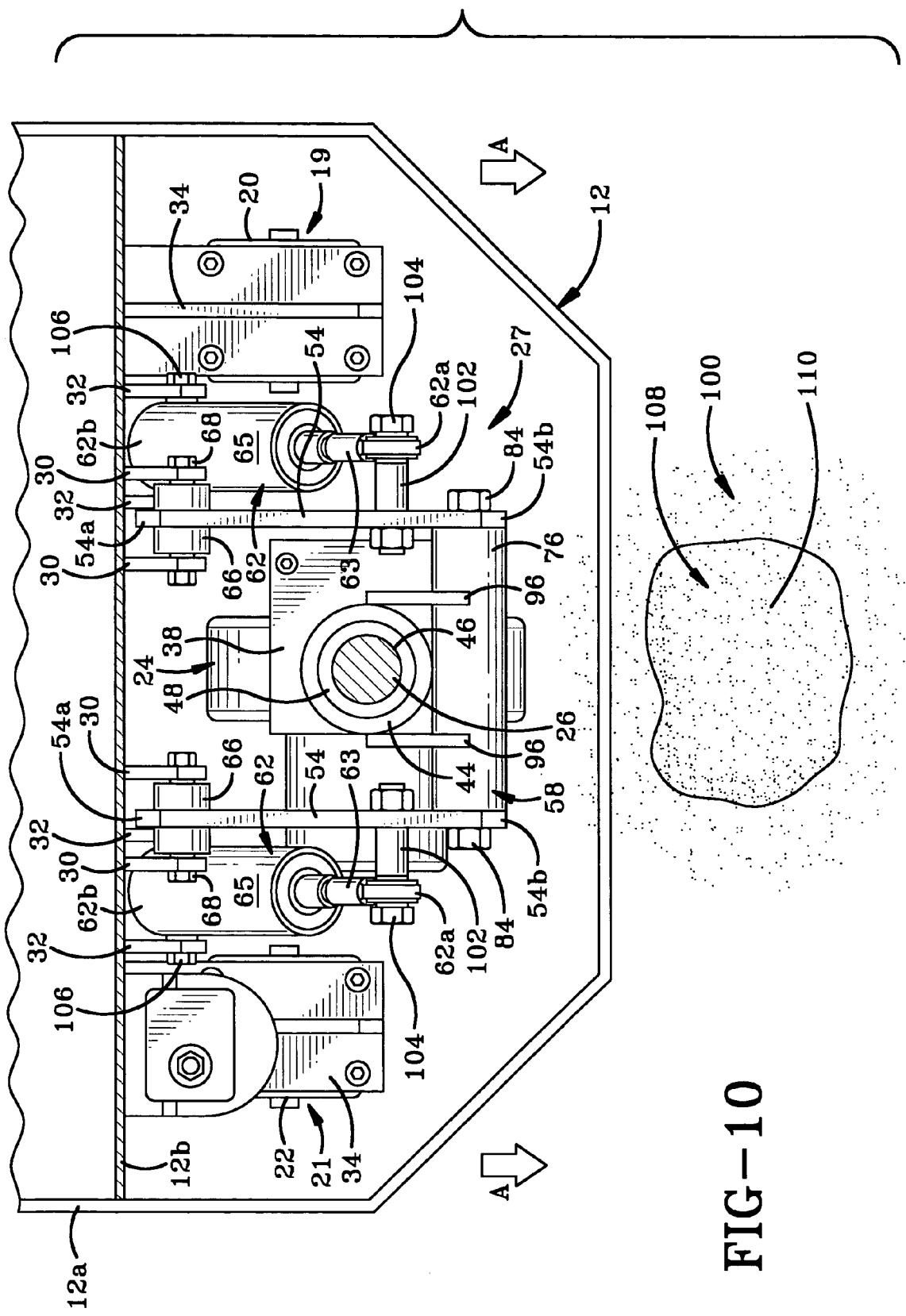
FIG. 10 is a partial top view of the material handling lift vehicle moving toward a depression in the ground surface.

Upper and lower swing arms 54, 56 are of substantially the same length and each arm has a longitudinal axis extending from a first end 54a and 56a to a second end 54b and 56b, respectively. In FIG. 2, the longitudinal axis of upper swing arm 54 is indicated by the line Y-Y' and the longitudinal axis of lower swing arm 56 is indicated by the line Z-Z'. First end 54a of each upper swing arm 54 is provided with an aperture 64 (FIG. 9). A sleeve 66 is received through aperture 64 and a pin 68 pivotally connects first end 54a of each upper swing arm 54 between a pair of brackets 30, such as pair 30a or 30b (FIG. 9). Similarly, first end 56a of each lower swing arm 56 is provided with an aperture 70 and a sleeve 72 and pin 74 are received therethrough to pivotally connect each lower swing arm 56 to a pair of brackets 30a or 30b. Upper swing arms 54 are disposed vertically above lower swing arms 54 on brackets 30.

Figure 8:
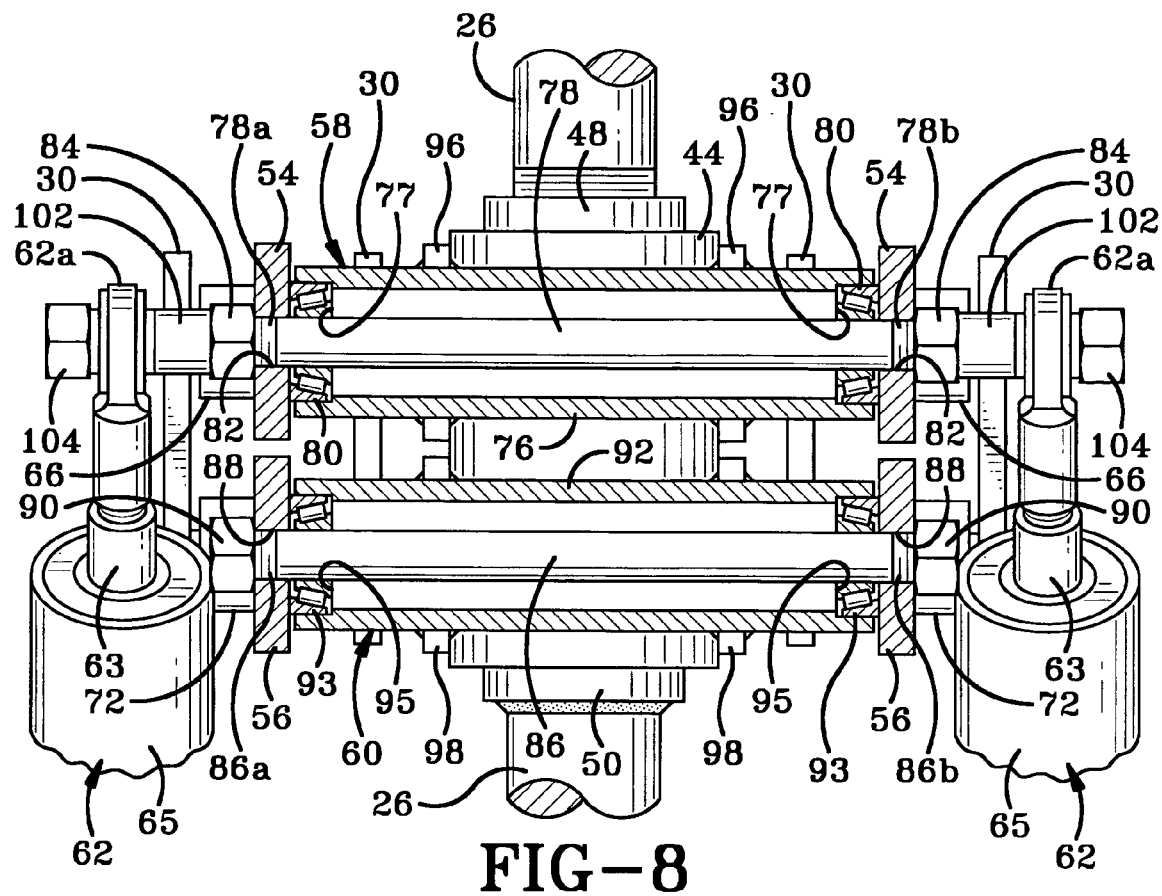
FIG. 8 is a partial cross-sectional front elevational view through line 8-8 of FIG. 4, showing the stabilizer bars in greater detail.

FIG. 8 shows that upper stabilizer bar 58 is positioned between the second ends 54b of upper swing arms 54. Upper stabilizer bar 58 includes a tubular member 76, a rod 78 and bearing assemblies 80. Tubular member 76 includes annular shoulders 77 for engaging bearing assemblies 80. Rod 78 has threaded ends 78a and 78b which extend outwardly from tubular member 76. Each threaded end 78a, 78b is received through an aperture 82 in second end 54b of one of upper swing arms 54. A nut 84 is screwed onto each threaded end 78a, 78b to pivotally connect upper swing arms 54 to upper stabilizer bar 58. Lower stabilizer bar 60 is substantially identical in structure and function to upper stabilizer bar 58. Lower stabilizer bar 60 is disposed between lower swing arms 56 and the threaded ends 86a, 86b of rod 86 are each received through an aperture 88 in second end 56b of one of lower swing arms 56 and are secured therein by a nut 90. Tubular member 92 is pivotally connected between second ends 56b of lower swing arms 56 via bearing assemblies 93. Tubular member 92 includes annular shoulders 95 which engage bearing assemblies 93. Upper and lower swing arms 54, 56 lie substantially parallel to each other when upper and lower stabilizer bars 58, 60 are secured thereto. Upper and lower swing arms 54, 56 are connected to brackets 30 in such a way that they are separated from each other by a small gap 94. Upper and lower stabilizer bars 58, 60 lie substantially parallel to each other and at right angles to the longitudinal axes Y-Y', Z-Z', of the upper and lower swing arms 54, 56.

Figure 4:
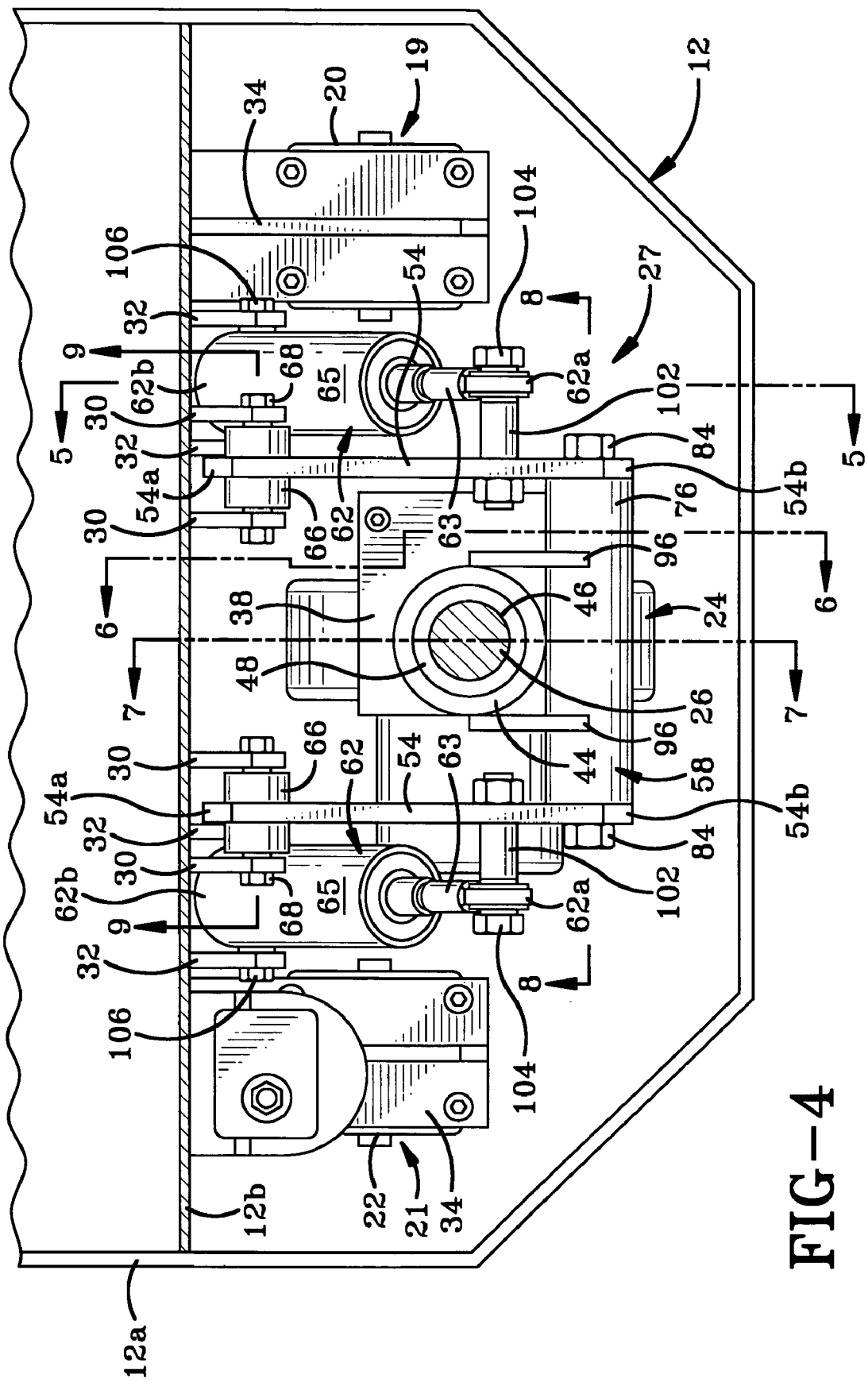
FIG. 4 is a partial top view of the material handling lift vehicle and suspension system.
Figure 5:
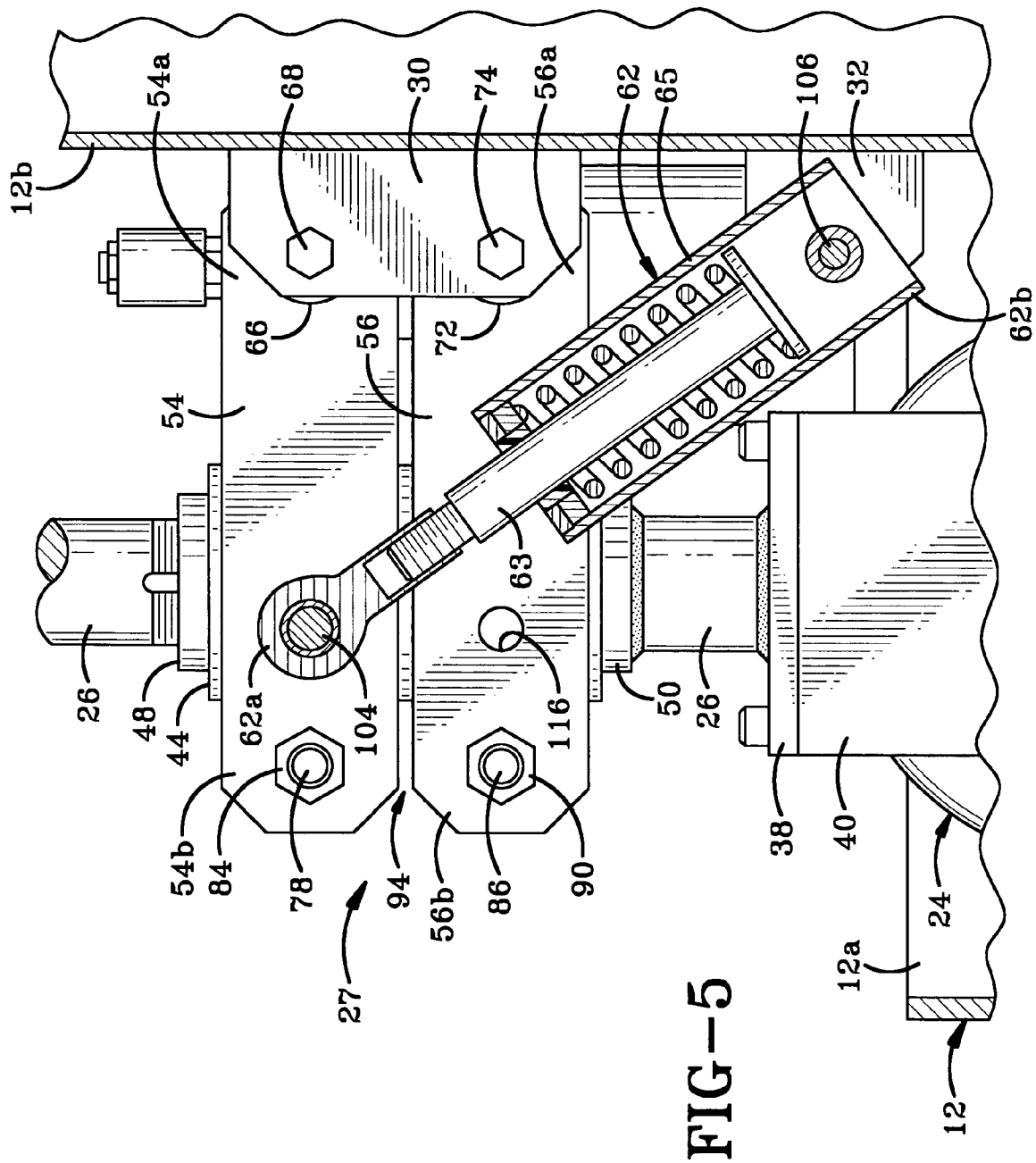
FIG. 5 is a partial cross-sectional side elevational view through line 5-5 of FIG. 4, showing the shock dampener in greater detail.
Figure 6:
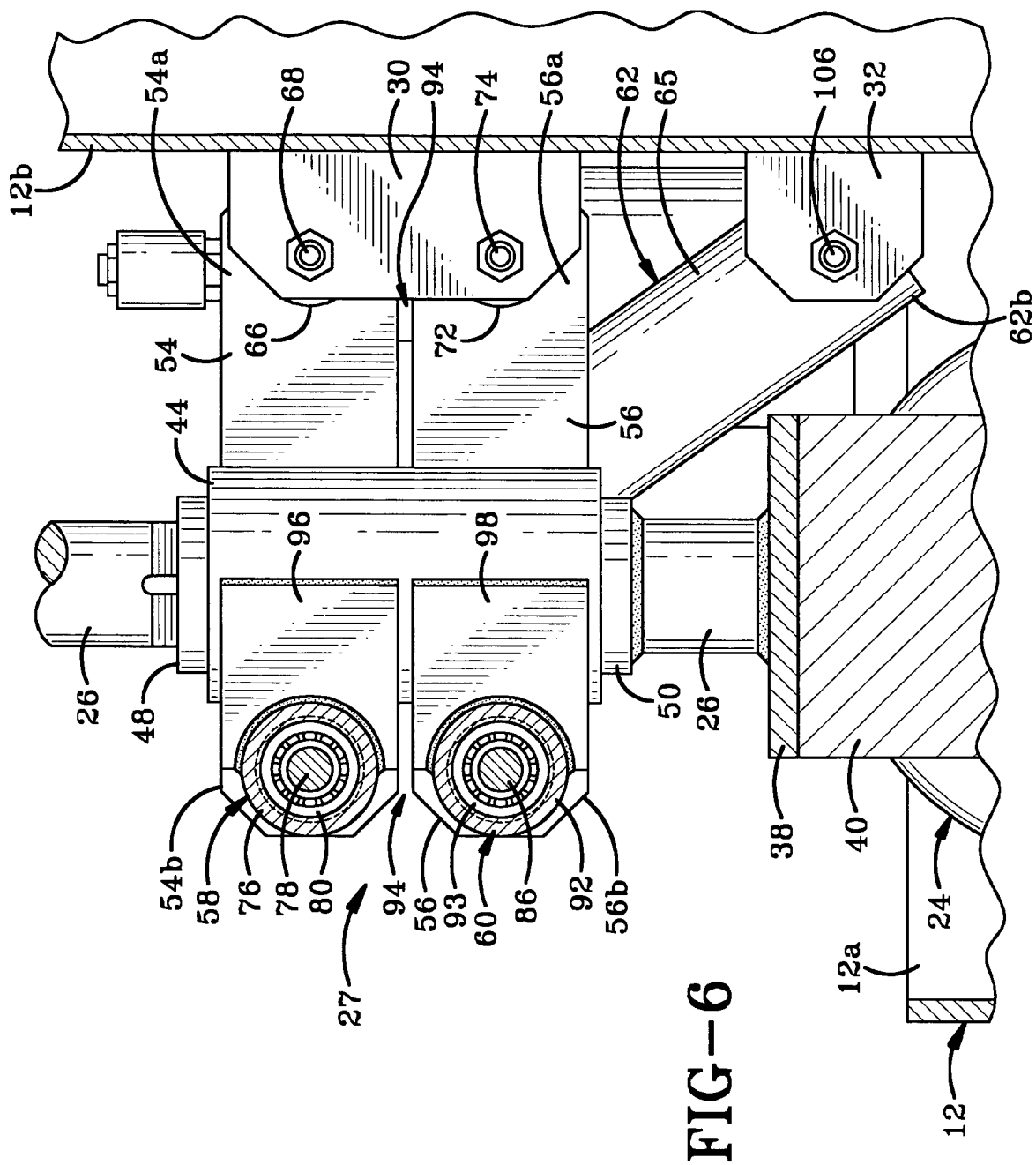
FIG. 6 is a partial cross-sectional side elevational view through line 6-6 of FIG. 4, showing the stabilizer bars and their connection to the outer surface of the steering column housing.
Figure 7:
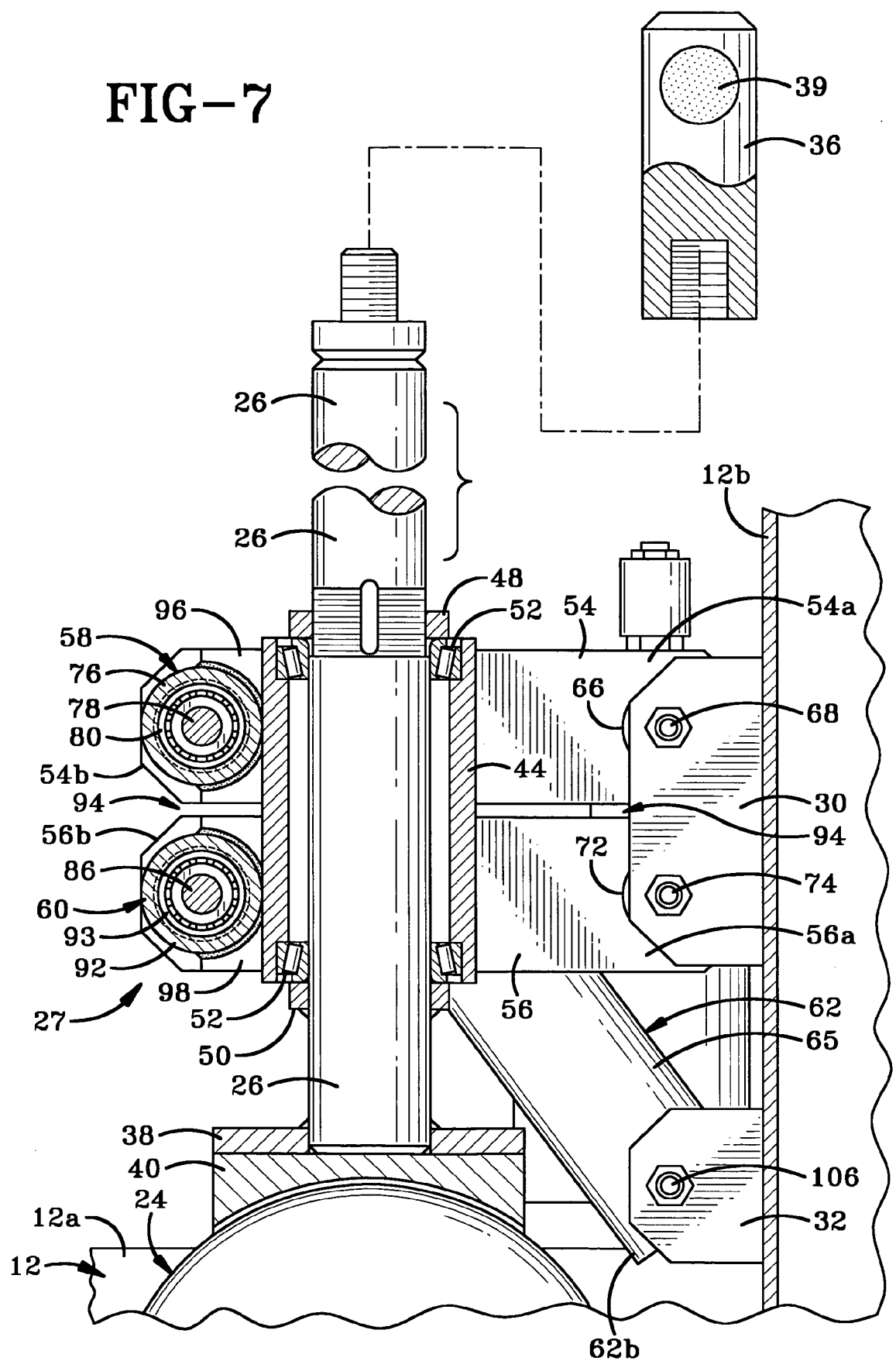
FIG. 7 is a partial cross-sectional side elevational view through line 7-7 of FIG. 4, showing the connection of the housing to the steering column.

Referring to FIGS. 4, 7 and 8, a pair of laterally spaced plates 96 are provided to connect upper stabilizer bar 58 to housing 44. A second pair of laterally spaced plates 98 are provided to connect lower stabilizer bar 60 to housing 44. Plates 96 and 98 each have an arcuate first end complementary sized and shaped to engage the outer surfaces of tubular members 76, 92, respectively. The first ends of plates 96 and 98 are welded to tubular members 76, 92, respectively. Plates 96 and 98 abut the outer surface of housing 44 (FIG. 4) and are welded thereto. Plates 96, 98 lie substantially parallel to the longitudinal axes Y-Y', Z-Z', of upper and lower swing arms 54, 56. Upper and lower stabilizer bars 59, 60 are therefore rigidly connected to steering column 26 and, consequently, when steering column 26 moves vertically up and down as drive wheel 24 travels over a surface 100, upper and lower stabilizer bars 58,60 move in unison with steering column 26 about bearing assemblies 80.

Referring to FIGS. 2-5, shock dampeners 62 are provided to dampen the reciprocating motion of steering column 26 and to maintain constant traction and steering effort and control when drive wheel 24 travels over uneven areas of surface 100. A first end 62a of each shock dampener 62 is pivotally connected, via a spacer 102 and pin 104, through an aperture (not shown) in one of upper swing arms 54. The second end 62b of each shock dampener 62 is pivotally connected between a pair of brackets 32 by a pin 106. Shock dampeners 62 preferably are of the type having a spring biased piston rod 63 that reciprocates in and out of a cylinder 65, but could equally be of any other known type of shock dampener without departing from the spirit of the present invention.

Figure 11:
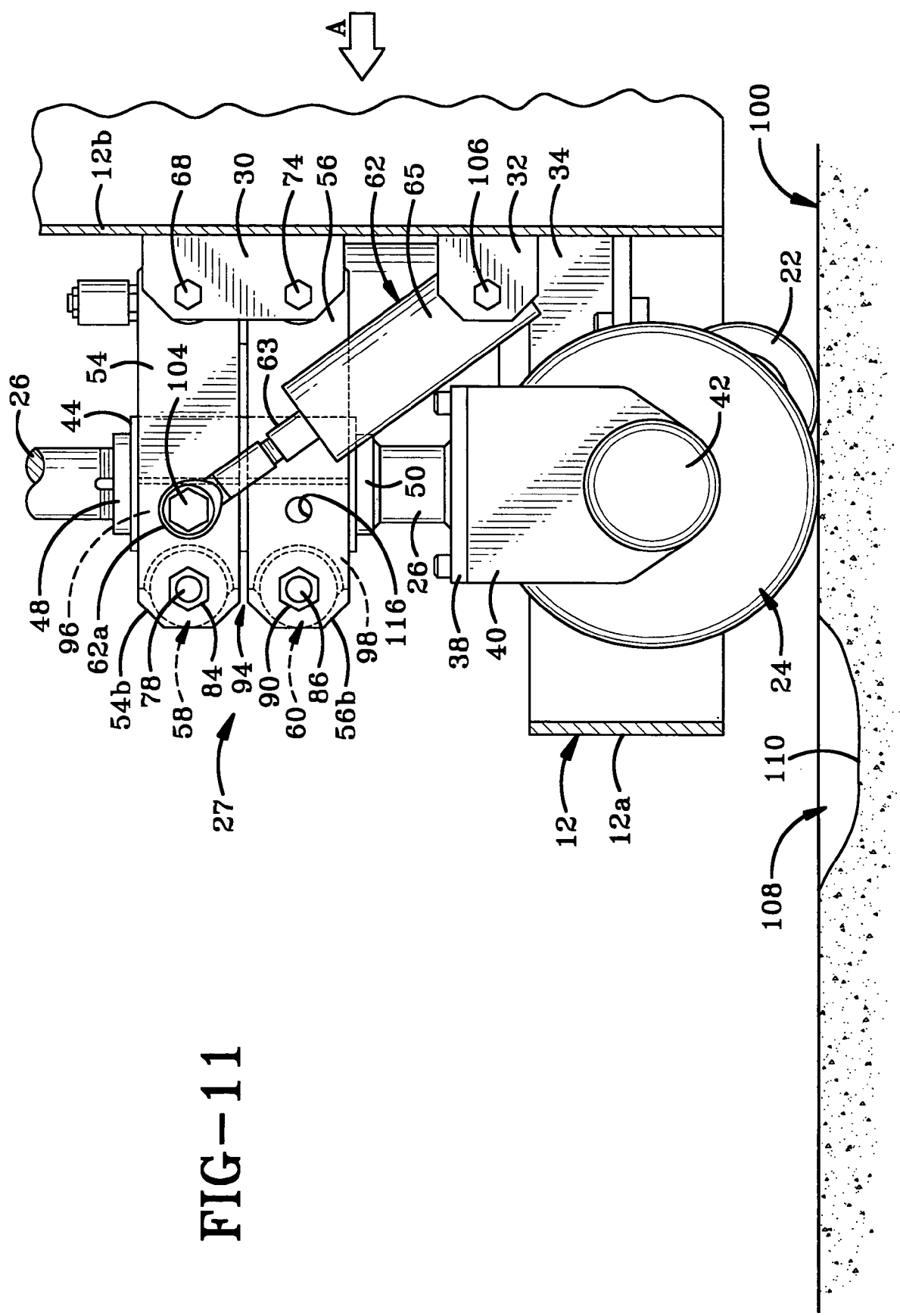
FIG. 11 is a partial cross-sectional side elevational view of the material handling lift vehicle as shown in FIG. 10, showing the suspension system in its rest position as it travels over a relatively flat surface.
Figure 12:
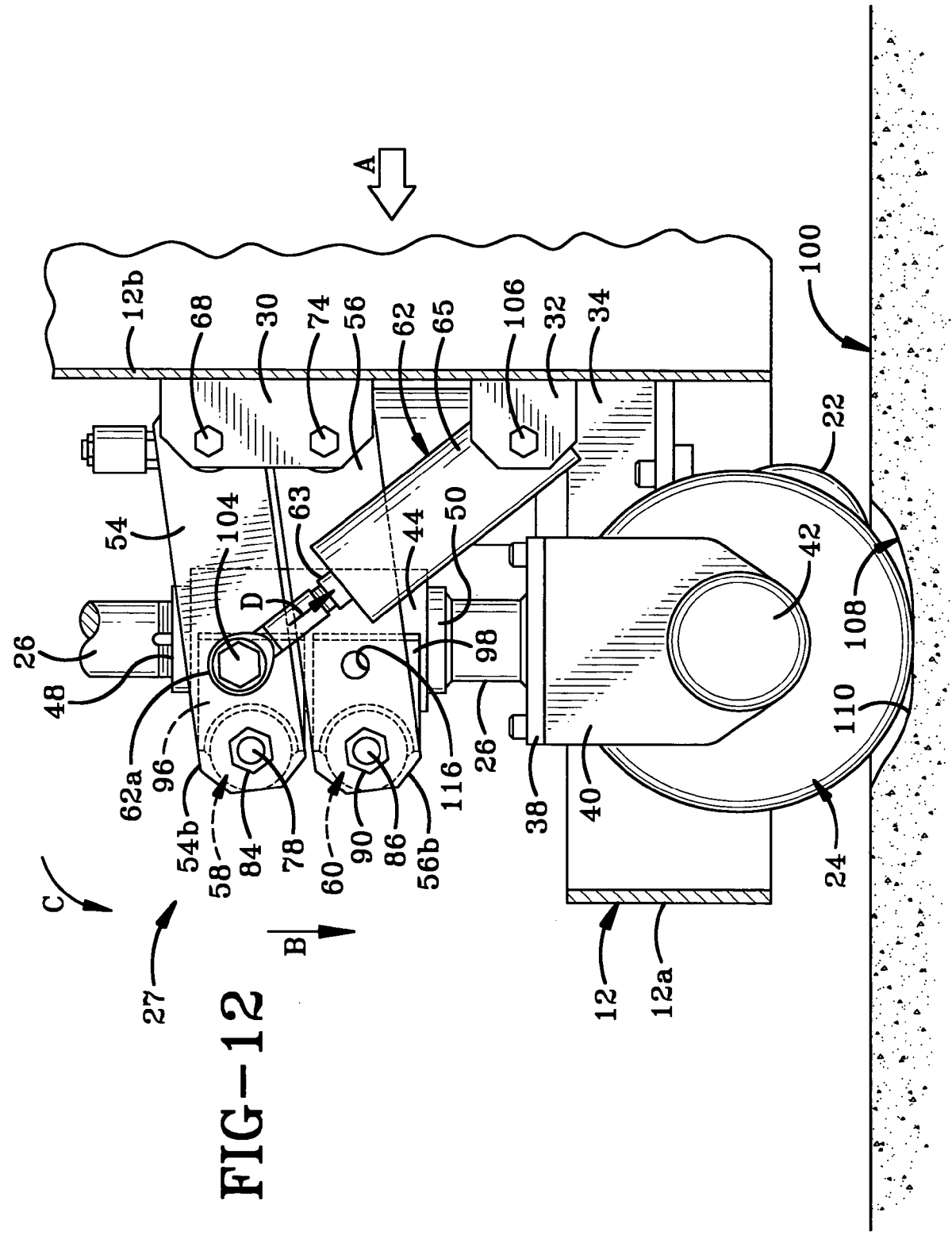
FIG. 12 is a partial cross-sectional side elevational view of the material handling lift vehicle showing the drive wheel entering a depression in the ground surface and showing the related movement in the positions of the suspension system components.
Figure 13:
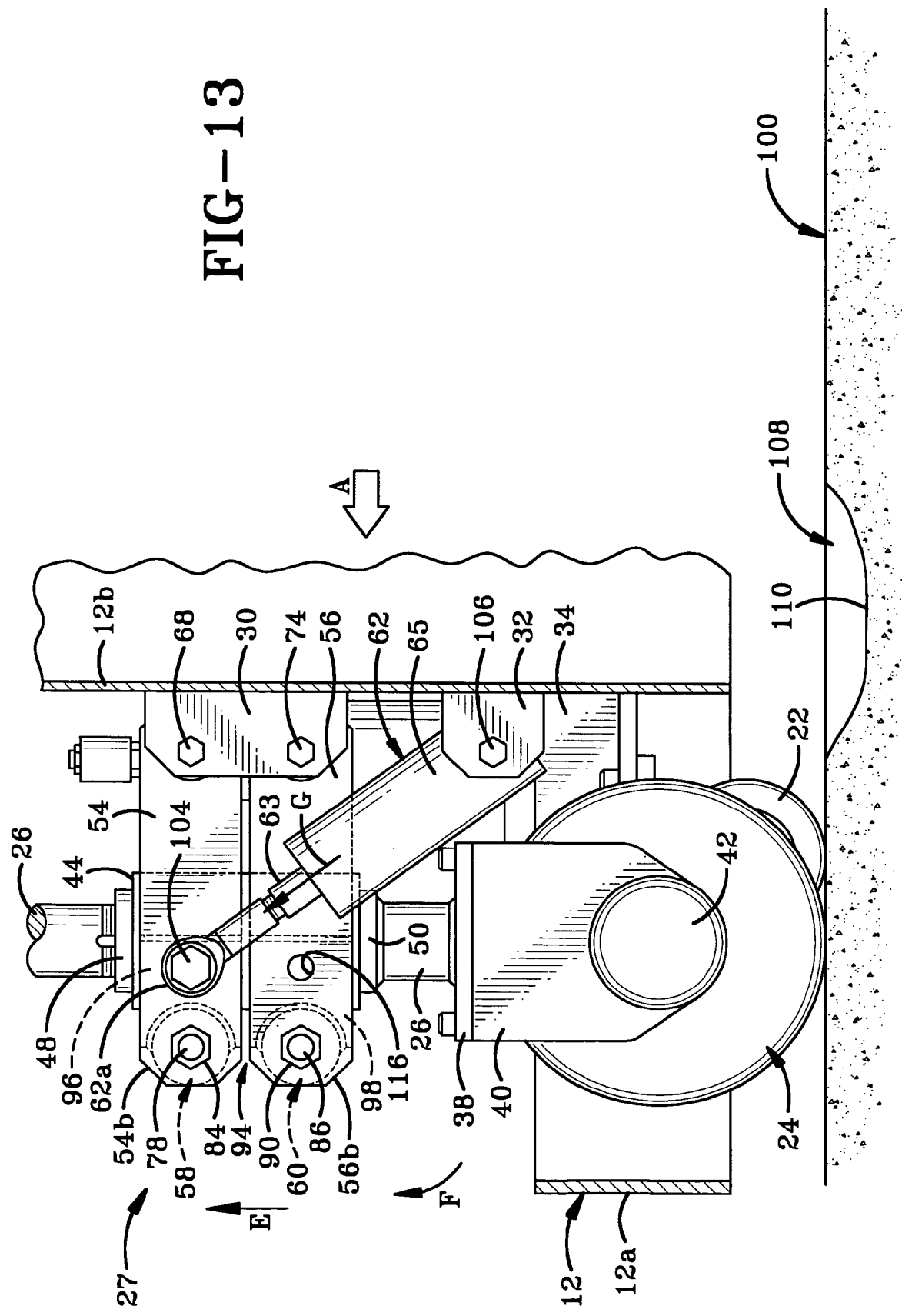
FIG. 13 is a partial cross-sectional side elevational view of the material handling lift vehicle after it has exited the depression in the surface and showing the suspension system returning to its rest position.

Referring to FIGS. 10-13, in use, material handling lift vehicle 10 may be driven over surface 100 in the direction of the arrow "A". FIG. 11 shows the position of upper and lower swing arms 54, 56 when surface 100 is flat and even and all wheels of vehicle 10 engage surface 100 in the same plane. Upper and lower swing arms 54, 56 extend outwardly from and generally normal to frame 12b and lie substantially normal to the longitudinal axis X-X' of steering column 26. As vehicle 10 continues to move in the direction of the arrow "A", drive wheel 24 enters a small depression 108 in surface 100. If steering column 26 was not provided with suspension system 27, drive wheel 24 would lose contact with surface 100 and traction, control and forward motion of vehicle 10 would be impeded. However, steering column 26 is provided with suspension system 27 and, consequently, when drive wheel 24 enters depression 108, steering column 26 moves vertically downwardly in the direction of arrow "B" toward surface 100 (FIG. 12) causing drive wheel 24 to remain in contact with the surface 110 of depression 108. As upper and lower stabilizer bars 58, 60 are rigidly attached to housing 44, they move downwardly in the direction of arrow "B" when steering column 26 moves downwardly in the direction of arrow "B". This causes second ends 54b and 56b of upper and lower swing arms 54, 56, respectively, to move in an arc "C", thereby moving first end 62a of each shock dampener 62 downwardly. This, in turn, drives piston rods 63 into cylinders 65 in the direction of arrow "D". As vehicle 10 continues to move in the direction of the arrow "A", drive wheel 24 exits depression 108 and steering column 26 moves upwardly in the direction of arrow "E" (FIG. 13). The upward motion of steering column 26 is transferred to upper and lower stabilizer bars 58, 60 and thereby to second ends 54b and 56b of upper and lower swing arms 54, 56, causing them to begin to move in an arc indicated by arrow "F". The release of the downward thrust on piston rods 63 allows them to rebound in the direction of arrow "G" and this allows upper and lower swing arms 54, 56 to return to their rest position. Wheels 20 and 22 remain in contact with surface 100 when drive wheel 24 travels into and out of depression 108. The forward motion of vehicle 10 in the direction of the arrow "A" is therefore not interrupted or impeded, traction and control are not lost and no additional stress is placed upon the power unit (not shown) even though vehicle 10 is traveling over an uneven surface.

Figure 14:
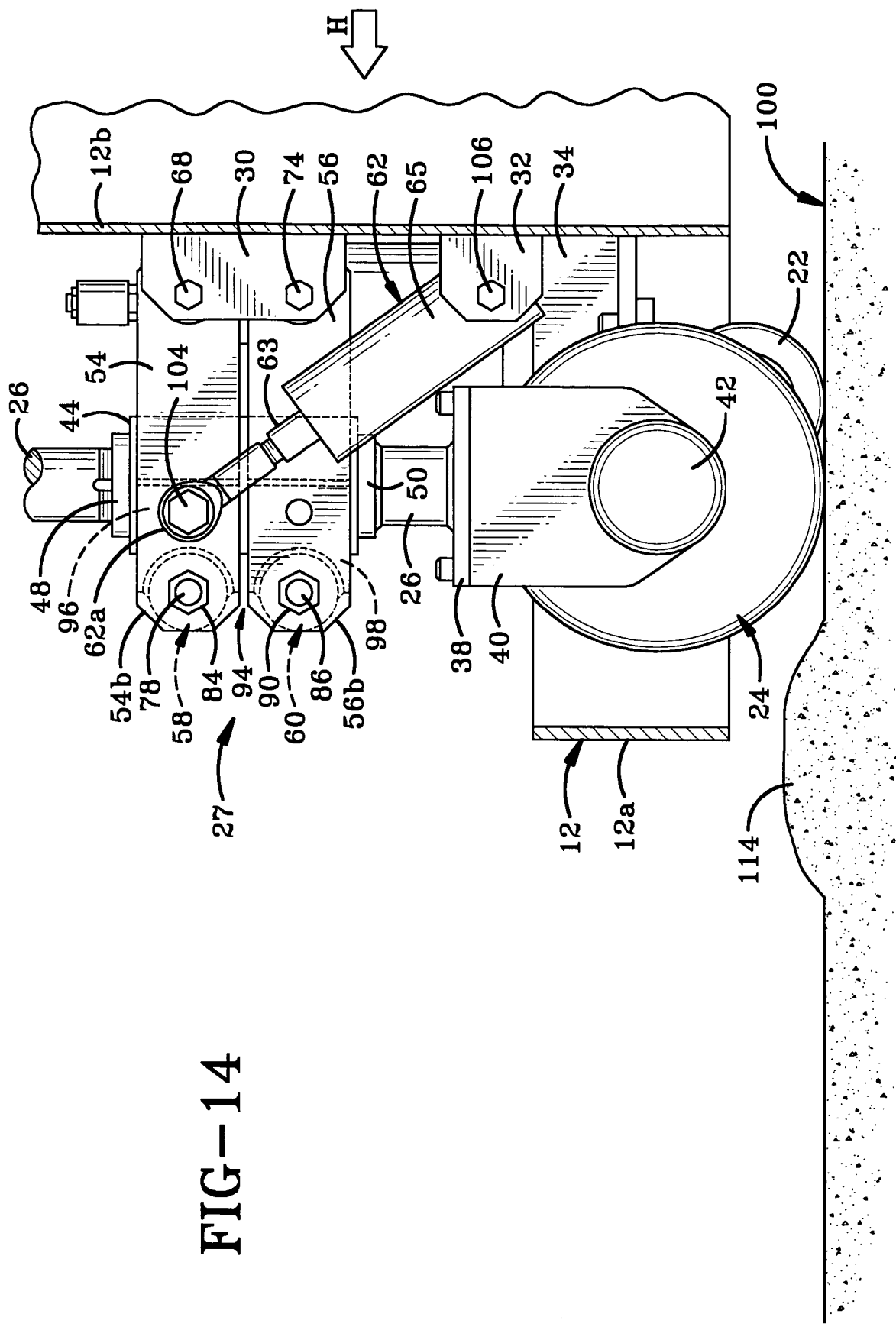
FIG. 14 is a partial cross-sectional side elevational view of the material handling lift vehicle approaching a bump in the surface over which it is traveling.
Figure 15:
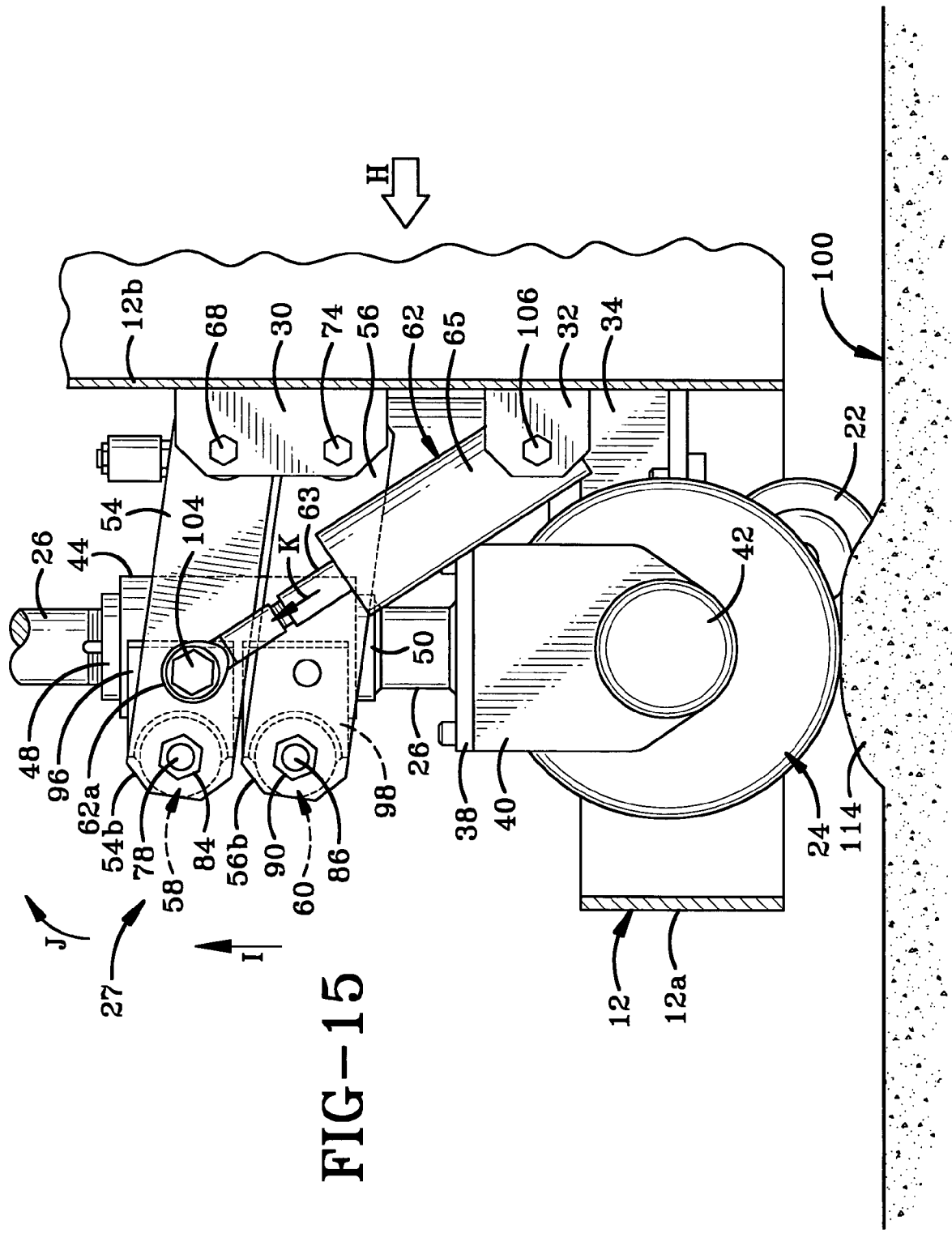
FIG. 15 is a partial cross-sectional side elevational view of the material handling lift vehicle showing the drive wheel riding over the bump in the surface and showing the related movement in the suspension system.
Figure 16:
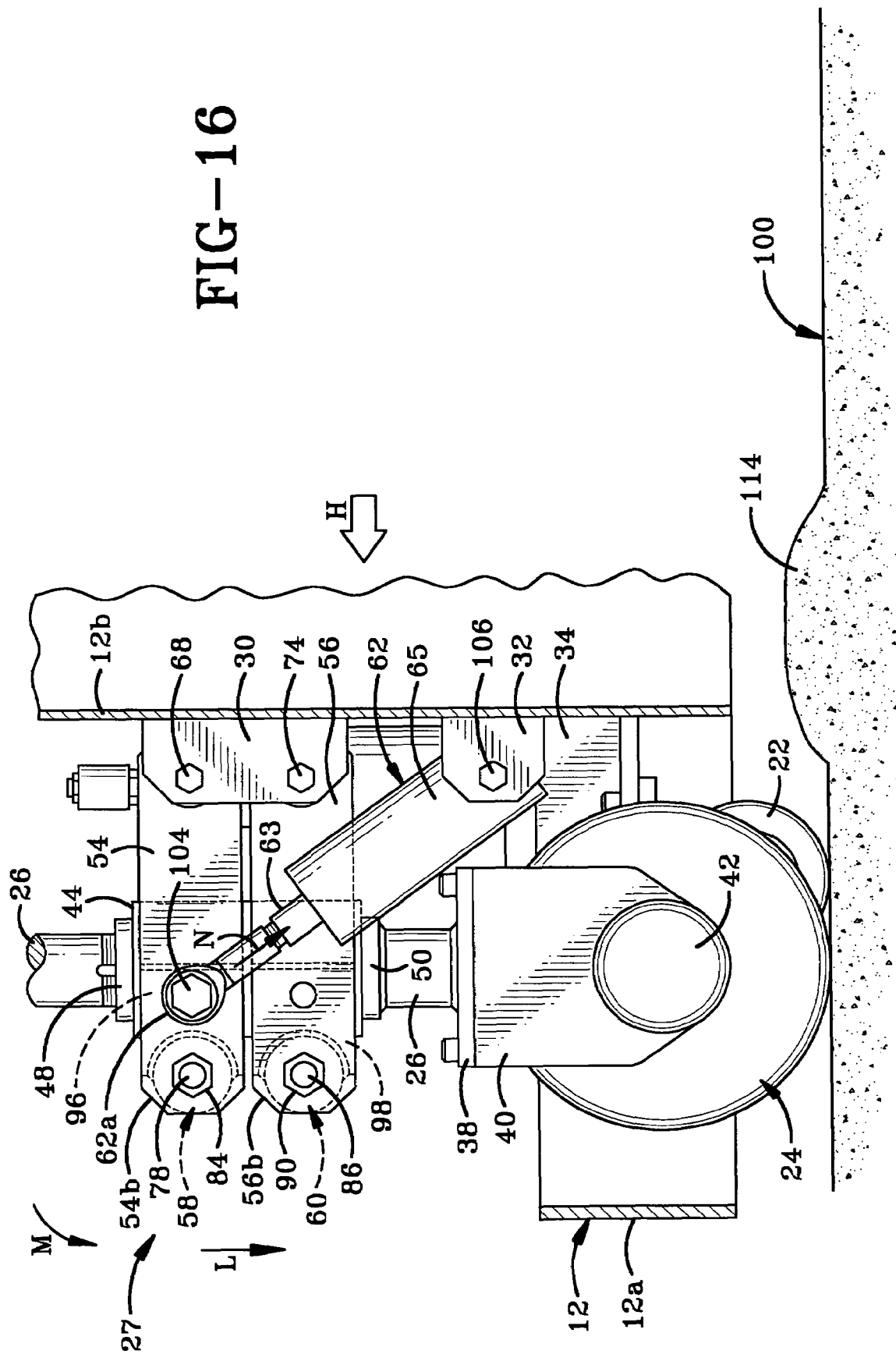
FIG. 16 is a partial cross-sectional side elevational view of the material handling lift vehicle with the suspension system returning to its rest position after negotiating the bump in the ground surface.

Referring to FIGS. 14-16, suspension system 27 is also useful for assisting vehicle 10 to negotiate bumps 114 in surface 100 without wheels 20, 22 lifting off surface 100 and stressing power unit (not shown) and increasing steering effort. Vehicle 10 moves in the direction of arrow "H". When vehicle 10 is traveling over a flat or even section of surface 100, upper and lower swing arms 54, 56 are in the rest position where their longitudinal axes lies at ninety degrees to the longitudinal axis of steering column 26. As vehicle 10 continues in the direction "H", drive wheel 24 travels upwardly onto bump 114 and, as it does so, it causes steering column 26 to be forced upwardly in the direction of the arrow "I". Upper and lower stabilizer bars 58, 60 move upwardly in the direction of the arrow "I" with steering column 26. Second ends 54b and 56b of upper and lower swing arms 54, 56 are moved in an arc "J", causing piston rod 63 to be drawn out of cylinder 65 in the direction of arrow "K". This allows the wheels 20 and 22 to remain in contact with surface 100 while drive wheel 24 moves over bump 114. Drive wheel 24 is therefore not carrying any additional weight of vehicle 10 as it travels over bump 114 and power unit (not shown) is therefore not additionally stressed and traction is maintained and steering effort remains constant. When drive wheel 24 rolls off bump 114 and returns back to the flat even surface 100, steering column 26 moves downwardly in the direction of arrow "L" (FIG. 16). The movement in steering column 26 causes downward movement in upper and lower stabilizer bars 58, 60, and thereby causes upper and lower swing arms 54, 56 to move in an arc "M". Piston rods 63 consequently rebound in the direction of arrow "N". This returns upper and lower swing arms 54, 56 to their rest position. The entire time that drive wheel 24 is traveling over bump 114 the wheels 20, 22 remain in contact with surface 100.

It will be understood that modifications may be made to vehicle 10 without departing from the spirit of the present invention. Material handling lift vehicle 10 is shown to include a motor to raise and lower the load carrying platform and to move the vehicle across the terrain. Vehicle 10 may, alternatively, be provided with a hand-cranked winch, to raise and lower platform, and a handle used to push the unit across the terrain by hand. Additionally, the shock dampener is shown as being attached to the upper swing arm, but it could alternatively be connected to the lower swing arm by inserting a pin (not shown) through aperture 116. Upper and lower stabilizer bars may be manufactured with a pair of laterally spaced slots therein to receive plates instead of having a concavely shaped front edge for receiving the convexly shaped stabilizer bar. Furthermore, while the bolt passing through the stabilizer bar is shown as having threaded ends that are secured with nuts to the swing arms, it will be understood that other rods and fasteners could be utilized, such as a pin with a cooperating cotter pin. It will also be understood that while the suspension system is disclosed as connecting the drive wheel to the frame, such a system could also be mounted on any or all of the side wheels.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claim is:

1. A material handling lift, for moving a load both horizontally across a surface and vertically relative to the surface, the lift comprising:
   a frame, wherein at least a portion thereof is adapted to receive the load thereon;
   an elongated steering column having a first end, a second end and a longitudinal axis extending therebetween;
   an axle mounted on the second end of the steering column and at right angles to the longitudinal axis thereof;
   a drive wheel rotatably received on the axle; whereby the drive wheel engages the surface;
   a pair of laterally spaced side wheels mounted on the frame for engaging the surface;
   a parallelogram suspension system for resiliently connecting the drive wheel to the frame; wherein the suspension system comprises:
   a pair of upper swing arms;
   a pair of lower swing arms;
   at least one stabilizer bar mounted between one of the pairs of upper swing arms and lower swing arms;
   a shock dampener connected to one of the pairs of upper and lower swing arms.

2. The material handling lift of claim 1, further comprising:
   a connector for fixedly connecting the stabilizer bar to the steering column.

3. The material handling lift of claim 2, wherein the upper and lower swing arms, steering column and the frame form a parallelogram of the parallelogram suspension.

4. The material handling lift of claim 3, in which the steering column is disposed between at least one of the pair of upper swing arms and lower swing arms.

5. The material handling lift of claim 4, in which the steering column is disposed between the frame and the stabilizer bar.

6. The material handling lift of claim 2, wherein the frame has a vertical wall and the parallelogram suspension system is mounted to the vertical wall.

7. The material handling lift of claim 6, in which the shock dampener is mounted to the vertical wall of the frame.

8. The material handling lift of claim 2, wherein the parallelogram suspension system is disposed between the first and second ends of the steering column.

9. The material handling lift of claim 2, wherein rotational movement of the suspension system causes vertical movement of the steering column.

10. The material handling lift of claim 8, further comprising a handle bar mounted on the first end of the steering column.

11. The material handling lift of claim 1, wherein each upper swing arm is vertically disposed above one of the lower swing arms.

12. The material handling lift as defined in claim 11, wherein the upper and lower swing arms are all of substantially the same length.

13. The material handling lift as defined in claim 1, wherein the stabilizer bar includes a pin extending therethrough and in which the pin has a pair of ends which are each received through an aperture in one of the upper and lower swing arms and are secured therein by a fastener.

14. The material handling lift as defined in claim 13, wherein the stabilizer bar further includes a bearing assembly disposed proximate each end of the pin, the bearing assembly adapted to allow the stabilizer bar to rotate about its longitudinal axis.

15. The material handling lift as defined in claim 14, wherein each end of the pin is threaded.

16. The material handling lift as defined in claim 14, wherein the stabilizer bar has ends that engage the one of the pairs of upper and lower swing arms; and in which each stabilizer bar end defines a shoulder therein and each bearing assembly is seated in one of the shoulders of the stabilizer bar.

17. The material handling lift as defined in claim 1, further comprising a second stabilizer bar mounted between the other of the pairs of upper and lower swing arms.

18. The material handling lift as defined in claim 17, wherein the second stabilizer bar includes a second pin extending therethrough and in which the second pin has a pair of ends which are each received through an aperture in the other of the upper and lower swing arms and are secured therein by a fastener.

19. The material handling lift as defined in claim 8, wherein the second stabilizer bar further includes ends that engage the other of the pairs of upper and lower swing arms and each second stabilizer bar end defines a second shoulder therein; and wherein the second stabilizer bar further includes a second bearing assembly disposed proximate each end of the second pin and each second bearing assembly is seated in one of the second shoulders of the second stabilizer bar.

20. The material handling lift as defined in claim 1, wherein a first end of the shock dampener is connected to a support bracket which extends outwardly from the frame.

21. The material handling lift as defined in claim 20, wherein each upper and lower swing arm has a first end and a second end; and each of the first ends of each of the upper and lower swing arms are connected to one of a pair of second support brackets which extend outwardly from the frame; and a second end of the shock dampener is connected to the second end of one of the upper and lower swing arms.

22. The material handling lift as defined in claim 21, further comprising a second shock dampener connected to the frame and to the second end of the other of the upper and lower swing arms.

23. The material handling lift of claim 2, wherein the connector comprises a plate fixedly connected to the steering column and to the stabilizer bar.

24. The material handling lift of claim 23, wherein an end of the plate for connection to the stabilizer bar is concave in shape and is complementary sized and shaped to engage with an outer surface of the stabilizer bar.

25. The material handling lift of claim 24, further comprising a housing coaxially received around the steering column and wherein the plate is fixedly connected between the housing and the stabilizer bar.

26. The material handling lift of claim 25, further comprising a second bearing assembly disposed at either end of the housing and lying between the housing and the steering column, wherein the second bearing assemblies allow for rotation of the housing about the steering column.

27. The material handling lift of claim 26, wherein the housing has an upper end and a lower end is secured to the steering column between a pair of collars, one of the collars engaging the upper end of the housing and the other collar engaging the lower end of the housing.

28. The material handling lift of claim 27, further comprising:
   a second stabilizer bar mounted between the other of the pairs of upper and lower swing arms; and
   a second connector for connecting the second stabilizer bar to the housing; wherein the longitudinal axis of the second stabilizer bar lies substantially at ninety degrees to the longitudinal axis of the steering column.

29. The material handling lift of claim 28, wherein the second connector comprises a second plate fixedly connected to the housing and to the second stabilizer bar and in which an end of the second plate for connecting to the second stabilizer bar is concave in shape and is complementary sized and shaped to engage an outer surface of the second stabilizer bar.

30. A material handling lift comprising:
   a frame;
   an elongated steering column;
   a drive wheel rotatably mounted on an end of the steering column and adapted to engage a ground surface over which the lift is to travel;
   a suspension system connecting the steering column to the frame; wherein said suspension system includes:
   a pair of aligned swing arms; each swing arm having a first end pivotably connected to the frame and a second end remote therefrom;
   a stabilizer bar pivotally mounted between the second ends of the swing arms, said stabilizer bar having an arcuate outer surface;
   at least one plate fixedly connected to the steering column and having an arcuate first end complementary shaped to engage the outer surface of the stabilizer bar;
   a shock dampener having a first end thereof connected to the frame and a second end thereof secured to one of the swing arms.

* * * * *

UNITED STATES PATENT AND TRADEMARK OFFICE
CERTIFICATE OF CORRECTION

PATENT NO. : 7,267,349 B2 Page 1 of 1
APPLICATION NO. : 10/933732
DATED : September 11, 2007
INVENTOR(S) : Sica et al.

It is certified that error appears in the above-identified patent and that said Letters Patent is hereby corrected as shown below:

Column 8, line 18 insert --1-- before "8" -- as defined in claim 18

Signed and Sealed this

Eighteenth Day of December, 2007

JON W. DUDAS
*Director of the United States Patent and Trademark Office*